United States Patent [19]

Quinn et al.

[11] Patent Number: 4,714,657

[45] Date of Patent: Dec. 22, 1987

[54] MELAMINE BASED PROTECTIVE COATINGS FOR THERMOPLASTIC SUBSTRATES

[75] Inventors: Clayton B. Quinn; Richard R. McClish; James E. Moore, all of Mount Vernon, Ind.

[73] Assignee: General Electric Company, Pittsfield, Mass.

[21] Appl. No.: 724,841

[22] Filed: Apr. 18, 1985

[51] Int. Cl.⁴ ............................................. B32B 27/36
[52] U.S. Cl. .................................. 428/412; 428/480; 525/443; 525/519
[58] Field of Search ................ 525/443, 519; 428/412, 428/480

[56] References Cited

U.S. PATENT DOCUMENTS

| | | | |
|---|---|---|---|
| 3,425,974 | 2/1969 | Semroc | 260/21 |
| 3,449,467 | 6/1969 | Wynstra | 260/29.4 |
| 3,806,480 | 4/1974 | Leonard | 260/24 |
| 3,843,390 | 10/1974 | Hudson | 117/138.8 F |
| 3,959,201 | 5/1976 | Chang | 525/443 X |
| 3,994,851 | 11/1976 | Chang | 260/29.4 R |
| 4,140,729 | 2/1979 | Tobias et al. | 525/443 X |
| 4,218,355 | 8/1980 | Chang et al. | 260/29.4 R |
| 4,440,913 | 4/1984 | Sugiura et al. | 525/443 |

FOREIGN PATENT DOCUMENTS 1308697 2/1973 United Kingdom .

*Primary Examiner*—Theodore E. Pertilla

[57] ABSTRACT

A protective coating composition containing certain polyester polyols and an aminoplast derivative is applied to a thermoplastic substrate to produce a thermoformable article having mar- and solvent-resistance.

9 Claims, No Drawings

MELAMINE BASED PROTECTIVE COATINGS FOR THERMOPLASTIC SUBSTRATES

This invention relates to thermoplastic articles protected by thermoformable aminoplast based mar- and solvent-resistant coatings. More particularly, this invention relates to thermoformable protective coatings applied to thermoplastic substrates containing an aminoplast derived component, a polyester polyol, and, optionally, other ingredients.

BACKGROUND

In the past years, plastics have become commercially vital materials used in a wide range of applications. Particularly, plastics may be applied as transparent articles, as translucent articles, or to opaque surfaces to provide texture, shine, and durability. Generally, these applications require a high degree of abrasion resistance in addition to other required properties, for example, impact strength, tensile strength, or elongation.

To date, no plastic exists which can be made to possess all desirable properties in the desirable proportions. Therefore, a coatings technology has developed which allows the joining of plastic materials and thereby a joining of their desirable properties. For example, the coatings technology may be used to join a substrate possessing high impact resistance, tensile strength, non-opacity, and elongation resistance, such as for example, a polycarbonate substrate, with an outer surface coating possessing high abrasion resistance, and low susceptibility to attack by solvents such as for example, an etherified aminoplast derived coating to produce a single article possessing the structural strength of the polycarbonates and the resistance to surface attack of the etherified aminoplast derivatives.

Coatings suitable for use on plastic substrates must also possess other secondary properties which render them useable. For example, a coating applied for abrasion resistance must also be compatible with the substrate, have good adhesion to the substrate and preferably, be weather resistant, thermoformable, and solvent resistant. It is often in secondary properties that a particular coating may be judged unsuitable for use in any particular application. Therefore, it is in the secondary properties that much effort for improvement is directed.

U.S. Pat. No. 4,197,392, assigned to the same assignee as the present invention, discloses a UV resistant transparent coating for plastic materials containing a melamine, a polyol, and a benzophenone. This coating has both weather resistance and thermoformability, however a greater degree of these two properties is desirable.

Copending patent application U.S Serial No. 641,914 filed Aug. 17, 1984, now U.S. Pat. No. 4,552,936, discloses aminoplast derived protective coatings for thermoplastic substrates. These coatings contain specific polycaprolactone polyester polyols as a critical polyester polyol component.

It is therefore, an object of the present invention to provide protective coating compositions which may be applied to plastic substrates, particularly polycarbonate substrates to impart abrasion resistance and solvent resistance with improved adhesion.

It is another object of the present invention to provide a protective coating for plastic substrates, particularly polycarbonate substrates, which will continue to adhere and weather well subsequent to a thermoforming process.

It is another object of the present invention to provide a method for protecting sensitive thermoplastic sheet from abrasion and solvent attack, even after prolonged weathering or thermoforming.

It is yet another object of the present invention to provide an abrasion resistant and solvent resistant coated thermoplastic article which will withstand thermoforming and prolonged weathering.

Various other objects and advantages of this invention will become apparent to those skilled in the art from the accompanying description and disclosure.

DETAILED DESCRIPTION OF THE INVENTION

Briefly, there are provided by the present invention, improved mar- and solvent-resistant coatings on thermoplastic resinous substrates, which coatings comprise the reaction products of:

(a) an aminoplast derived component; and
(b) a polyester polyol consisting essentially of the reaction products of diacids and diols, and optionally, polyols with hydroxyl functionality greater than two, wherein the diacids comprise at least 50% by number aliphatic diacids in which the carboxylic acid groups are separated by at least two intervening carbon atoms, the diols comprise at least 50% by number aliphatic diols in which carbon atoms containing hydroxyl groups are separated by at least three intervening carbon atoms, the polyol content results in an average hydroxyl functionality which is from about 2 to about 3, and the hydroxyl number is from about 50 to about 175.

Optionally, the coating may further comprise:
(c) catalyst,
(d) reaction stabilizers,
(e) ultraviolet light stabilizers or absorbers, and,
(f) other additives or reactants.

Preferably, the substrate is a polycarbonate substrate.

Suitable thermoplastic resinous substrates which may be used include acetal homopolymers; acetal copolymers produced by polymerization of trioxane and ethylene oxide; epoxy resins; polycarbonates; poly(ester-carbonate); polyetherimides; phenylene oxide based resins such as polyphenylene oxide and blends of polyphenylene oxide and styrene resins; polyaryl ethers; polyesters; polyethylenes; polyphenylene sulfides; polypropylene; polysulfones; ethylene polymers such as ethyl vinyl acetates; and blends thereof with necessary compatibilizers.

As stated above, the substrate is preferably a thermoplastic resinous polycarbonate, particularly an aromatic polycarbonate. These are homopolymers and copolymers and mixtures thereof that are prepared by reacting a dihydric phenol with a carbonate precursor. Suitable dihydric phenols of the bisphenol type are available and disclosed in U.S. Pat. Nos. 2,999,835, 3,028,365 and 3,334,154 which are incorporated herein by reference.

The aminoplasts for use herein are amine-aldehyde reaction products, i.e., aldehyde condensation products of amine compounds. Preferably, the aldehyde employed is formaldehyde, although the products can be made from other aldehydes, such as acetaldehyde, crotonaldehyde, acrolein, benzaldehyde, furfural and others. Suitable amines for use herein are for example, those of melamine, urea, triazines, diazines, triazoles, guanidines, guanamines, and alkyl and aryl substituted derivatives of such compounds including alkyl and aryl substituted melamine provided at least two amino groups are present.

These aminoplasts contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including aliphatic alcohols such as methanol, ethanol, propanol, butanol, and other alkanols, usually having up to about 6 carbon atoms; aromatic alcohols; such as benzyl alcohol cyclic alcohols such as cyclohexanol; monoethers of glycols such as the Cello-Solves and Carbitols; and halogen-substituted or other substituted alcohols such as 3-chloropropanol.

Though the above amines, aldehydes, and alcohols are suitable, the preferred aminoplast derived component of the coating composition of this invention is an amine-aldehyde-alcohol of the general formula:

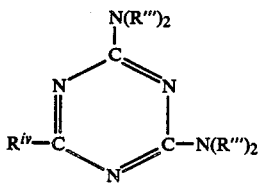

wherein $R'''$ is independently selected from H, $-CH_2OH$, and $-CH_2O(CH_2)_zH$, wherein z is an integer from 1 to 6, and $R^{iv}$ is selected from H, $-OH$, $-CH_3$ and $-N(R''')_2$. Preferably, $R^{iv}$ is $-N(R''')_2$ and all $R'''$ are an alkoxymethyl, particularly, methoxymethyl.

The aminoplast derived component is produced in a manner well known in the art using acidic or basic catalyst and varying conditions of time and temperature in accordance with conventional practice. The aldehyde is often employed as a solution in water or alcohol and the condensation, etherification, and polymerization reactions may be carried out either sequentially or simultaneously.

CYMEL 301 hexamethoxymethylmelamine is commercially available from American Cyanamid Company. This aminoplast derivative is a clear liquid with a specific gravity of 1.2, refractive index of 1.515–1.520, a free formaldehyde percent maximum of 0.30, a low free methylol content, an equivalent weight of 130–190, and a vapor pressure, 180° C., mm of 0.02–0.03.

The polyester polyols suitable for use herein are principally the reaction products of diacids and diols wherein the diacids comprise at least 50% by number aliphatic diacids in which the carboxylic acid groups are separated by at least two, preferably four, intervening carbon atoms, and the diols comprise at least 50% by number aliphatic diols in which carbon atoms containing hydroxyl groups are separated by at least two, preferably four, intervening carbon atoms.

Suitable diacids for the at least 50% portion aliphatic diacids include succinic acid, glutaric acid, adipic acid, suberic acid, sebacic acid, azelaic acid, 1,12-dodecanedioic acid, 2,2,4- and 2,4,4-trimethyl-1,6-hexadioic acid. Preferred as the at least 50% portion aliphatic diacid is adipic acid. Suitable for use as the remaining diacids are unsaturated dicarboxylic acids, i.e., maleic acid, fumaric acid, itaconic acid, citraconic acid, etc.; cycloaliphatic diacids, i.e., 1,2-cyclohexanedicarboxylic anhydride, tetrahydrophthalic anhydride, 1,3-cyclohexanedicarboxylic acid, 1,4-cyclohexanedicarboxylic acid, etc.; and aromatic diacids, i.e., phthalic acid, isophthalic acid, terephthalic acid, etc. Preferably, the at least 50% portion aliphatic diacids are 100% of the diacids.

Suitable diols for the at least 50% portion aliphatic diols include glycols of the formula $HO(CH_2)_nOH$ wherein n equals 4–12 and methyl, ethyl, phenyl, etc., substituted derivatives thereof. Specific aliphatic diols include 1,6-hexanediol, 3-methyl-1,5-pentanediol, 2,2,4-trimethyl-1,5-pentanediol, etc. Preferred for use is 1,6-hexanediol. Suitable for use as the remaining diol are short chain aliphatic diols, i.e., 1,3-butanediol, 1,3-propylene glycol, 2,2-diethyl-1,3-propanediol, ethylene glycol, neopentyl glycol, etc.; aromatic diols, i.e., 4,4'-methylenebis(cyclohexanol), 4,4'-isopropylidenebis(cyclohexanol), phenylenedipropanols, etc.; and cycloaliphatic diols, i.e., 1,4-cyclohexanedimethanol, etc. Preferably, the diols in which carbon atoms containing hydroxyl groups separated by at least two, preferably four, intervening carbon atoms are 100% of the diols.

The functionality of the above polyester polyols may be adjusted by the addition of various polyol monomers having hydroxy functionalities of three or greater, in amounts effective to produce an average functionality of from about 2 to about 3. Thus, a single triol may be used in combination with various diacids and diols to produce a trifunctional hydroxy terminated polyester polyol. Suitable triols include trimethylol propane, trimethylolethane, 1,2,3-propanetriol, 1,2,4-butanetriol, 1,2,6-hexanetriol, etc. Likewise, lesser amounts of quadrifunctional polyols such as pentaerythritol may be used to achieve the same average functionality. Though the average hydroxy functionality of the polyester polyol may be varied between about 2 and about 3, preferably, it is about 2.

Preparation of the polyester polyol is accomplished by using known processes employed in preparing polyesters. Thus, the components of the polyester polyol can be reacted together in a single stage, i.e., all of the reactants are added to the reactor at the same time, or in several stages wherein the polyol and a portion of the acid are first reacted to form a partial ester, following which the remainder of the acid is reacted with the partial ester to form the finished ester. The equivalent ratio of total acid content to total alcohol content ranges from about 1:1.25 to about 1:1.1. For the present invention, the degree of polymerization during the reaction is controlled such that the hydroxyl number of the finished ester ranges, on average, from about 50 to about 175; and preferably, from about 100 to about 150.

The solvent used in the preparation of the coating composition includes alcohols, ketones, esters, ethers, alkoxy alkanols, halogenated compounds, carboxylic acids, aromatic compounds, or the like, which may be used alone or in a combination of two or more thereof. Particularly suitable examples of the solvent are lower alcohols (e.g. methanol, ethanol, propanol or butanol) and alkoxy alkanols (e.g. methyl cellosolve, ethyl cellosolve or butyl cellosolve).

The solvent employed must not injure the substrate to which the coating composition is applied, that is, it must be nonagressive yet it must be capable of dissolving the aminoplast derivative and in particular the polyester polyol. Preferably, the solvent should be of such a volatility that it can be easily evaporated and removed from the coating composition at temperatures below cure temperature. A suitable, nonagressive solvent for a given substrate and a given polyester polyol may be readily determined by one skilled in the art. The preferred solvent is butyl cellosolve.

Suitable catalysts are alkyl acid phosphates, such as monomethyl acid phosphate, monoethyl acid phosphate, monopropyl acid phosphate and monobutyl acid phosphate, as well as the corresponding dialkyl compounds, such as dibutyl acid phosphate. A mixture of mono- and dialkyl phosphates is often utilized. In addition to the alkyl acid phosphates, examples of other acid catalysts which can be used include phosphoric acid, maleic acid and anhydride, fumaric acid, chloromaleic acid and anhydride, alkyl acid phthalates such as methyl, ethyl, propyl and butyl acid phthalates, monoalkyl succinates and maleates such as methyl, ethyl, propyl and butyl succinates and maleates and others having sufficient solubility to permit them to be dissolved in the coating composition at the desired proportion. Catalysts which have been found to be particularly suitable are compounds such as the sulfonic acids and derivatives thereof including, for example, p-toluene sulfonic acid, methyl-p-sulfonic acid and the like.

Protective coating compositions which are to be prepared in advance of or stored prior to application and cure require reaction stabilizers or stabilizers to deactivate the catalyst until cure. It is within the skill of the art to determine a suitable stabilizer for use with a given catalyst. The preferred catalyst of the instant invention, p-toluene sulfonic acid as well as others may be stabilized with equimolar amounts of a suitable amine stabilizer, for example, methylaminoethanol, triethylamine, 2-amino-2-methyl-1-propanol but preferably the stabilizer is triethylamine.

Any suitable ultraviolet stabilizer may be used in the present invention at any concentration effective to protect the thermoplastic substrate from the degradative effects of light. Suitable ultraviolet absorbers are for example benzophenone derivatives, including:

2,2'4,4'-tetrahydroxybenzophenone;
2,2'-dihydroxy-4-methoxy-4'-ethoxybenzophenone;2-hydroxy-4,4',5'-trimethoxybenzophenone;
2-hydroxy-4-propoxy-4',6'-dichlorobenzophenone;
2-hydroxy-4-methoxy-4'-methylbenzophenone;
2-hydroxy-4-methoxy-2'-chlorobenzophenone;
2-hydroxy-4,4',5'-trimethoxybenzophenone;
2-hydroxy-4-ethoxy-4'-methoxybenzophenone;
2-hydroxy-4-ethoxy-4'-propoxybenzophenone; and the like. Suitable benzotriazole derivatives may also be employed including 2-(2'-hydroxy-5'-methylphenyl)-benzotriazole, 2-(2'-hydroxy-3'-methyl-5'-tert-butylphenyl)-benzotriazole, 2-(2'-hydroxy-3'-di-tert-butylphenyl)-benzotriazole and derivatives of crotonic acid such as a-cyano-b methyl-b-(p-methoxyphenyl)-crotonic acid methyl ester, a-cyano-b-N-(2-methyl-indolinyl)crotonic acid methyl ester, substituted acrylates such as 2 ethyl-hexyl-2-cyano-3,3-diphenyl acrylate as well as malonic acid esters such as, for example, the dimethyl, diethyl, dipropyl and the like esters of malonic acid and the like and mixtures thereof. Most preferred are the dihydroxybenzophenones such as: 2,4-dihydroxybenzophenone, 2,2'-dihydroxybenzophenone, 2-hydroxy-5-aminobenzophenone, 2,2',4,4'-tetrahydroxybenzophenone, 2,2',5,5'-tetrahydroxybenzophenone, dihydroxanthrophenones, dihydroxyanthrones, etc.

Other hydroxy functional reactants and additives may be added to the coating composition of the present invention, in addition to the polyester polyol. Hydroxy alkyl esters of addition polymerized unsaturated carboxylic acids, i.e., hydroxy functional polyacrylates or polymethacrylates may be useful to increase certain properties of the cured coating. Other properties of the cured coating may be increased upon the addition of aliphatic diols, i.e., the alkylene diols.

The protective coating composition may be blended by mixing the aminoplast derived component, the polyester polyol, an appropriate, nonagressive solvent, a catalyst, and optionally, a reaction stabilizer, UV stabilizer, and other additive or reactant. Preferably for each weight part polyester polyol there should be present from about 0.5 to about 3 and most preferably, from about ⅔ to about 7/3 parts by weight aminoplast derived component. The solvent should be added in sufficient amount to produce from about 15% to about 75% solids. The amount of catalyst, reaction stabilizer, and UV stabilizer which should be added is well within the determination of one skilled in the art. Of course, where other hydroxy functional reactants are present, the amount of aminoplast derivative necessary may be greater.

The protective coating composition may be applied to the thermoplastic substrate by any of the well known means. Spraying, dipping, roll coating, and the like are appropriate coating techniques. The parameters of the coating technique chosen should be adjusted so as to produce a cured protective coating having a thickness of from about 0.05 to about 1 mil. Preferably the thickness should be about 0.2 mils.

The preferred method of curing the applied coating composition is by heat curing. The coated substrate may be heated in ovens by infrared radiation, by microwave, etc. Preferably the solvent used in the coating composition should be substantially evaporated before the reaction or cure temperature of the coating is reached.

The following examples further demonstrate specific embodiments of the instant invention. They are intended to be illustrative and are not to be construed as placing a limitation on the scope of the invention herein disclosed.

Tests

Cross Hatch Adhesion Test (Adhesion Test)
  The sample is tested in accordance with the procedure of ASTM D-3359 Method B. Samples which attain a rating of 5B in the ASTM standard are given a "Pass". Samples which show any flaking or detachment of the squares in the lattice are given a "Fail".

Taber Abrasion Test (Abrasion Test)
  The sample is tested in accordance with the procedure of ASTM D-1044-78 using a CS-10F wheel, 500g load, and 100 cycles. The reported figure is the percentage of transmitted light that is scattered by the abraded specimens.

Thermoform Test
  The sample is heated to forming temperature and formed around a 1" radius mandrel. The sample is rated "Fail" if upon visual inspection any cracking, flaking, or detachment of the coating is observed.

Watersoak Test
  The sample is tested in accordance with the above Cross Hatch Adhesion Test and immersed in a 65° C. water bath. The reported figure is the number of days which the sample is soaked before any flaking or detachment of the squares in the lattice is observed in subsequent adhesion tests.

EXAMPLES 1-4

The following polyols were combined with CYMEL 301, butyl cellosolve, and a catalyst mixture having 20% by weight p-toluenesulfonic acid and 80% by weight 2-propanol in the gram weight proportions shown below. The resulting coating composition was dip coated onto a ⅛" BPA polycarbonate panel and cured to a noncritical thickness of less than 1 mil at a temperature of 130° C. for 2 hours.

TABLE 1

|  | 1 | 2 | 3 | 4 |
|---|---|---|---|---|
| CYMEL 301 | 192 | 192 | 192 | 192 |
| 1,4-butanediol | 48 | — | — | — |
| 1,6-hexanediol | — | 48 | — | — |
| Neopentylglycol | — | — | 48 | — |
| Trimethylolpropane | — | — | — | 48 |
| Butyl Cellosolve | 360 | 360 | 360 | 360 |
| Catalyst mixture | 12 | 12 | 12 | 12 |
| Adhesion Test | Fail | Fail | Fail | Fail |
| Abrasion Test | 4.8 | 3.5 | 6.4 | 4.7 |
| Thermoform Test | Fail | Fail | Fail | Fail |
| Watersoak Test | — | — | — | — |

EXAMPLE 5

A polyester polyol of 1,3-propanediol and adipic acid (hydroxyl number (OH)=55) was combined with CYMEL 301 compound, butyl cellosolve, a UV stabilizer, a reaction stabilizer mixture of triethylamine salt, and a catalyst mixture having 20% by weight p-toluenesulfonic acid and 80% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 2

|  | 5 |
|---|---|
| CYMEL 301 | 120 |
| Propylene-adipate (OH = 55) | 120 |
| Butyl Cellosolve | 360 |
| Catalyst Mixture | 10 |
| Dihydroxybenzophenone | 12 |
| Reaction Stabilizer Mixture | 1.2 |
| Adhesion Test | Pass |
| Abrasion Test | 10.6 |
| Thermoform Test | — |
| Watersoak Test | 1-3 |

EXAMPLES 6-10

A polyester polyol of neopentyl glycol and adipic acid (hydroxyl number (OH)=55, 110, or 200) was combined with CYMEL 301 compound, butyl cellosolve, a UV stabilizer, a reaction stabilizer mixture of triethylamine salt, and a catalyst mixture having 20% by weight p-toluene-sulfonic acid and 80% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 3

|  | 6 | 7 | 8 | 9 | 10 |
|---|---|---|---|---|---|
| CYMEL 301 | 120 | 120 | 72 | 120 | 168 |
| neopentyl-adipate (OH = 55) | 120 | — | — | — | — |
| Neopentyl-adipate (OH = 110) | — | 120 | — | — | — |
| Neopentyl-adipate (OH = 200) | — | — | 168 | 120 | 72 |
| Butyl Cellosolve | 360 | 360 | 360 | 360 | 360 |
| Catalyst Mixture | 10 | 10 | 10 | 10 | 10 |
| Dihydroxybenzophenone | 12 | 12 | 12 | 12 | 12 |
| Reaction Stabilizer Mixture | 1.2 | 1.2 | 1.2 | 1.2 | 1.2 |
| Adhesion Test | Pass | Pass | Fail | Fail | Pass |
| Abrasion Test | 8.8 | 10.4 | 34.6 | 7.4 | 8.2 |
| Thermoform Test | — | — | — | — | — |
| Watersoak Test | 1-3 | 1-3 | — | — | 2 |

EXAMPLE 11

A polyester polyol of 1,3-butanediol and adipic acid (hydroxyl number (OH)=110) was combined with CYMEL 301 compound, butyl cellosolve, a UV stabilizer, a reaction stabilizer mixture of triethylamine salt, and a catalyst mixture having 20% by weight p-toluenesulfonic acid and 80% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 4

|  | 11 |
|---|---|
| CYMEL 301 | 120 |
| Butylene-adipate (OH = 110) | 120 |
| Butyl Cellosolve | 360 |
| Catalyst Mixture | 10 |
| Dihydroxybenzophenone | 12 |
| Reaction Stabilizer Mixture | 1.8 |
| Adhesion Test | Pass |
| Abrasion Test | 16.2 |
| Thermoform Test | — |
| Watersoak Test | 1-3 |

EXAMPLES 12-22

A polyester polyol of a diol component divided approximately 0.4/0.6 by number neopentyl glycol/1,6-hexanediol and adipic acid (hydroxyl number (OH)=55, 120, or 200) was combined with CYMEL 301 compound, butyl cellosolve, a UV stabilizer, a reaction stabilizer mixture of triethylamine salt, and a catalyst mixture having 20% by weight p-toluene-sulfonic acid and 80% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 5

|  | 12 | 13 | 14 | 15 | 16 | 17 | 18 | 19 | 20 | 21 | *22 |
|---|---|---|---|---|---|---|---|---|---|---|---|
| CYMEL 301 | 72 | 120 | 144 | 168 | 72 | 120 | 144 | 168 | 72 | 120 | 168 |
| Neopentyl/1,6-hexyl-adipate (OH = 55) | 168 | 120 | 96 | 72 | — | — | — | — | — | — | — |
| Neopentyl/1,6-hexyl- | — | — | — | — | 168 | 120 | 96 | 72 | — | — | — |

TABLE 5-continued

|  | 12 | 13 | 14 | 15 | 16 | 17 | 18 | 19 | 20 | 21 | 22 |
|---|---|---|---|---|---|---|---|---|---|---|---|
| adipate (OH = 120) |  |  |  |  |  |  |  |  |  |  |  |
| Neopentyl/1,6-hexyl-adipate (OH = 200) | — | — | — | — | — | — | — | — | 168 | 120 | 72 |
| Butyl Cellosolve | 360 | 360 | 360 | 360 | 360 | 360 | 360 | 360 | 360 | 360 | 360 |
| Catalyst Mixture | 10 | 10 | 10 | 10 | 10 | 10 | 10 | 10 | 10 | 10 | 10 |
| Dihydroxybezophenone | 12 | 12 | 12 | 12 | 12 | 12 | 12 | 12 | 12 | 12 | 12 |
| Reaction Stabilizer Mixture | 1.2 | 1.2 | 1.2 | 1.2 | 1.2 | 1.2 | 1.2 | 1.2 | 1.2 | 1.2 | 1.2 |
| Adhesion Test | Pass | Pass | Pass | Pass | Pass | Pass | Pass | Pass | Fail | Fail | Pass |
| Abrasion Test | 35.4 | 7.8 | 6.4 | 7.4 | 43.4 | 7.2 | 6.4 | 6.6 | 40.0 | 8.2 | 7.6 |
| Thermoform Test | — | — | Fail | Fail | — | — | Pass | Pass | — | — | — |
| Watersoak Test | 58–65 | 58–65 | >51 | >65 | 16–33 | 10–17 | 37–44 | >65 | — | — | >23 |

EXAMPLES 23-30

A polyester polyol of 1,6-hexanediol and, a diacid component divided 0.7/0.3 by number adipic acid and isophthalic acid (hydroxyl number (OH)=55 or 120) was combined with CYMEL 301 compound, butyl cellosolve, a UV stabilizer, a reaction stabilizer mixture of triethylamine salt, and a catalyst mixture having 20% by weight p-toluene-sulfonic acid and 80% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 6

|  | 23 | 24 | 25 | 26 | 27 | 28 | 29 | 30 |
|---|---|---|---|---|---|---|---|---|
| CYMEl 301 | 72 | 120 | 144 | 168 | 72 | 120 | 144 | 168 |
| 1,6-hexylene-adipate/isophthalate (OH = 55) | 168 | 120 | 96 | 72 | — | — | — | — |
| 1,6-hexylene-adipate/isophthalate (OH = 120) | — | — | — | — | 168 | 120 | 96 | 72 |
| Butyl Cellosolve | 360 | 360 | 360 | 360 | 360 | 360 | 360 | 360 |
| Catalyst Mixture | 10 | 10 | 10 | 10 | 10 | 10 | 10 | 10 |
| Dihydroxybezophenone | 12 | 12 | 12 | 12 | 12 | 12 | 12 | 12 |
| Reaction Stabilizer Mixture | 1.2 | 1.2 | 1.2 | 1.2 | 1.2 | 1.2 | 1.2 | 1.2 |
| Adhesion Test | Pass | Pass | Pass | Pass | Pass | Pass | Pass | Pass |
| Abrasion Test | 14.6 | 5.0 | 6.2 | 7.8 | 23.6 | 7.2 | 6.0 | 7.4 |
| Thermoform Test | — | — | Fail | Fail | — | — | Pass | Pass |
| Watersoak Test | >58 | >58 | >58 | >58 | 37–44 | >58 | >51 | >58 |

EXAMPLE 31

A polyester polyol of a diol component divided approximately 0.4/0.6 by number neopentyl glycol/6-hexanediol and adipic acid (hydroxyl number (OH)=120) was combined with CYMEL 301 compound, butyl cellosolve, a UV stabilizer, a reaction stabilizer mixture of triethylamine salt, and a catalyst mixture having 40% by weight p-toluene-sulfonic acid and 60% by weight 2-propanol in the gram weights shown below. The resulting coating composition was dip coated onto a ⅛" BPA-polycarbonate panel and cured to a noncritical thickness of less than 1 mil at a temperature of 130° C. for 2 hours.

TABLE 7

|  | 31 |
|---|---|
| CYMEL 301 | 149.1 |
| Neopentyl/1,6 hexylene-adipate (OH = 120) | 112 |
| 1,4-butanediol | 95.2 |
| Butyl Cellosolve | 233.1 |
| UV Stabilizer[1] | 11.9 |
| Reaction Stabilizer Mixture | 0.5 |
| Adhesion Test | Pass |
| Abrasion Test | 9.6 |
| Thermoform Test | — |
| Watersoak Test | 6–10 |

[1]7.7/4.2 by weight ratio of b,b-diphenyl ethylacrylate/4-octoxy-2-hydroxybenzophenone

What is claimed is:

1. A composite comprising a thermoplastic polycarbonate substrate having applied to at least one surface thereof a water, mar- and solvent-resistant coating comprising the reaction products of:
   (a) an aminoplast derived component; and
   (b) a polyester polyol consisting essentially of the reaction products of diacids and diols wherein said diacids comprise at least 50% by number aliphatic diacids in which the carboxylic acid groups are separated by at least two intervening carbon atoms, said diols comprise at least 50% by number aliphatic diols in which the carbon atoms containing hydroxyl groups are separated by at least two intervening carbon atoms, and wherein the hydroxyl number is from about 50 to about 175.

2. The composite of claim 1 wherein said diacids are at least 50% by number adipic acid.

3. The composite of claim 1 wherein said diols are at least 50% by number 1,6-hexane diol.

4. The composite of claim 1 wherein said diacids consist essentially of about 100% by number aliphatic diacids in which the carboxylic acid groups are separated by at least two intervening carbon atoms.

5. The composite of claim 1 wherein said diols consist essentially of about 100% by number aliphatic diols in which the carbon atoms containing hydroxyl groups are separated by at least two intervening carbon atoms.

6. The composite of claim 1 wherein said polyester polyol has a hydroxyl number ranging from about 100 to about 150.

7. The composite of claim 1 wherein said aminoplast derived component has a general formula:

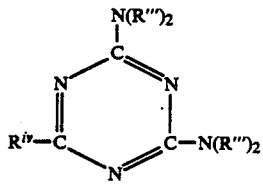

wherein R''' is independently selected from the group consisting of H, —CH$_2$OH, and —CH$_2$O(CH$_2$)$_z$H, z is an integer from 1 to 6 and R$^{iv}$ is selected from the group consisting of H, —OH, —CH$_3$ and —N(R'41 )$_2$.

8. The composite of claim 7 wherein R''' is —CH$_2$OCH$_3$ and R$^{iv}$ is —N(R''')$_2$.

9. A composite comprising a thermoplastic polycarbonate substrate having applied to at least one surface thereof a water, mar- and solvent-resistant coating comprising the reaction products of:

(a) an aminoplast derived component having the general formula:

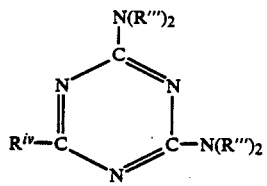

wherein R''' is independently selected from the group consisting of H, —CH$_2$OH, and —CH$_2$O(CH$_2$)$_z$H, z is an integer from 1 to 6 and R$^{iv}$ is selected from the group consisting of H, —OH, —CH$_3$ and —N(R''')$_2$, and (b) a polyester polyol consisting essentially of the reaction products of diacids and diols, wherein said diacids comprise at least 50% by number aliphatic diacids in which the carboxylic acid groups are separated by at least two intervening carbon atoms, said diols comprise at least 50% by number aliphatic diols in which carbon atoms containing hydroxyl groups are separated by at least three intervening carbon atoms, and the hydroxyl number is from about 50 to about 175.

* * * * *